United States Patent [19]

Hofmann et al.

[11] 4,220,404
[45] Sep. 2, 1980

[54] MICROFICHE READER

[75] Inventors: Wilfried Hofmann; Günther Lüder, both of Taufkirchen; Ruth Oppermann, Unterhaching; Adolf Hermann Moll, Geiselbullach, all of Fed. Rep. of Germany

[73] Assignee: Agfa-Gevaert AG., Munich, Fed. Rep. of Germany

[21] Appl. No.: 938,945

[22] Filed: Sep. 5, 1978

[30] Foreign Application Priority Data

Sep. 6, 1977 [DE] Fed. Rep. of Germany ... 7727582[U]

[51] Int. Cl.² .............................................. G03B 23/08
[52] U.S. Cl. ............................ 353/27 R; 353/DIG. 5
[58] Field of Search ............. 353/DIG. 5, 27 R, 27 A

[56] References Cited

U.S. PATENT DOCUMENTS

| 3,190,174 | 6/1965 | Field | 353/DIG. 5 |
| 3,834,800 | 9/1974 | Brownscombe | 353/27 R |

Primary Examiner—Steven L. Stephan

[57] ABSTRACT

A film screen is perpendicularly slidably mounted on a first guide rail in a microfiche reader. This first guide rail is detachably mounted on a frame which in turn is slidably mounted on a second guide rail perpendicularly with respect to said first guide rail so that the two guide rails form a coordinate support arrangement for selectively displacing the film screen in two mutually perpendicular directions. The second guide rail is mounted on the base of the microfiche reader. The film screen and first guide rail can be easily detached from the frame and replaced by a film screen and first guide rail of different size which is then attached to the frame.

7 Claims, 4 Drawing Figures

MICROFICHE READER

BACKGROUND OF THE INVENTION

The invention relates to a microfiche reader having a film screen that is slidably movable along two coordinate directions for receiving projected images of microfiches. The screen is mounted on at least two guide rails which are mutually perpendicular and which are operatively connected to the base of the microfiche reader.

Such an arrangement in a microfiche reader is for example disclosed in German published utility model No. 67 35 429. This type of mounting for a film screen is however not suitable in microfiche readers which are adapted to process film screens of different sizes, whereby the user of the microfiche reader mounts or dismounts film screens in the reader in accordance with the size of the to be read microfiche. Were the aforementioned arrangement of the German Utility Model used in a microfiche reader adapted to read microfiches on screens of different sizes, then the coordinate guiding and supporting system would have to be designed to accommodate the largest of the film screens read by the microfiche reader. When this microfiche reader is then used with a smaller film screen it detracts from the outward appearance of the instrument and also increases the manufacturing cost of such an instrument as well as the handling thereof.

SUMMARY OF THE INVENTION

It is an object of this invention to couple the film screen with the reader in such a way that it can be exchanged for a film screen of a different size without difficulty.

In accordance with the invention there is provided in the microfiche reader a guide rail which is slidably movably mounted in a first direction. There is, furthermore, slidably movably mounted in the microfiche reader at least a second guide rail which is movable in a second direction. The first and second guide rails are detachably connected to each other.

Thus, the arrangement of the invention includes a film screen wherein the longitudinal guide rail is adapted to the lateral guide rail of the film screen. The user of the microfiche reader which only requires the smallest film screen to be used with the reader no longer requires, for example, the use of a double screen which encompasses the use of very long guide rails. Moreover, the unattractive appearance and negative esthetic impression caused by a long guide rail used in conjunction with a small film screen is avoided.

Furthermore, the arrangement of the invention includes the advantageous feature in providing limit stops along the adjustment path of the slideably mounted guide rails which simplifies the handling of the microfiche reader by eliminating the lateral slideable displacement of the screen beyond the scanning region of the objective of the reader. This is of particular significance for those microfiche readers which utilize a so-called "floating objective," as is quite common, whereby the "floating objective" is resiliently mounted on top of the transparent cover plate of the film screen.

BRIEF DESCRIPTION OF THE DRAWING

To illustrate in more precise manner also the various features of the invention, there will now be described preferred embodiments, but which is to be regarded as in no way limiting, with reference to the accompanying drawings, in which.

DETAILED DESCRIPTION

Figure 1:
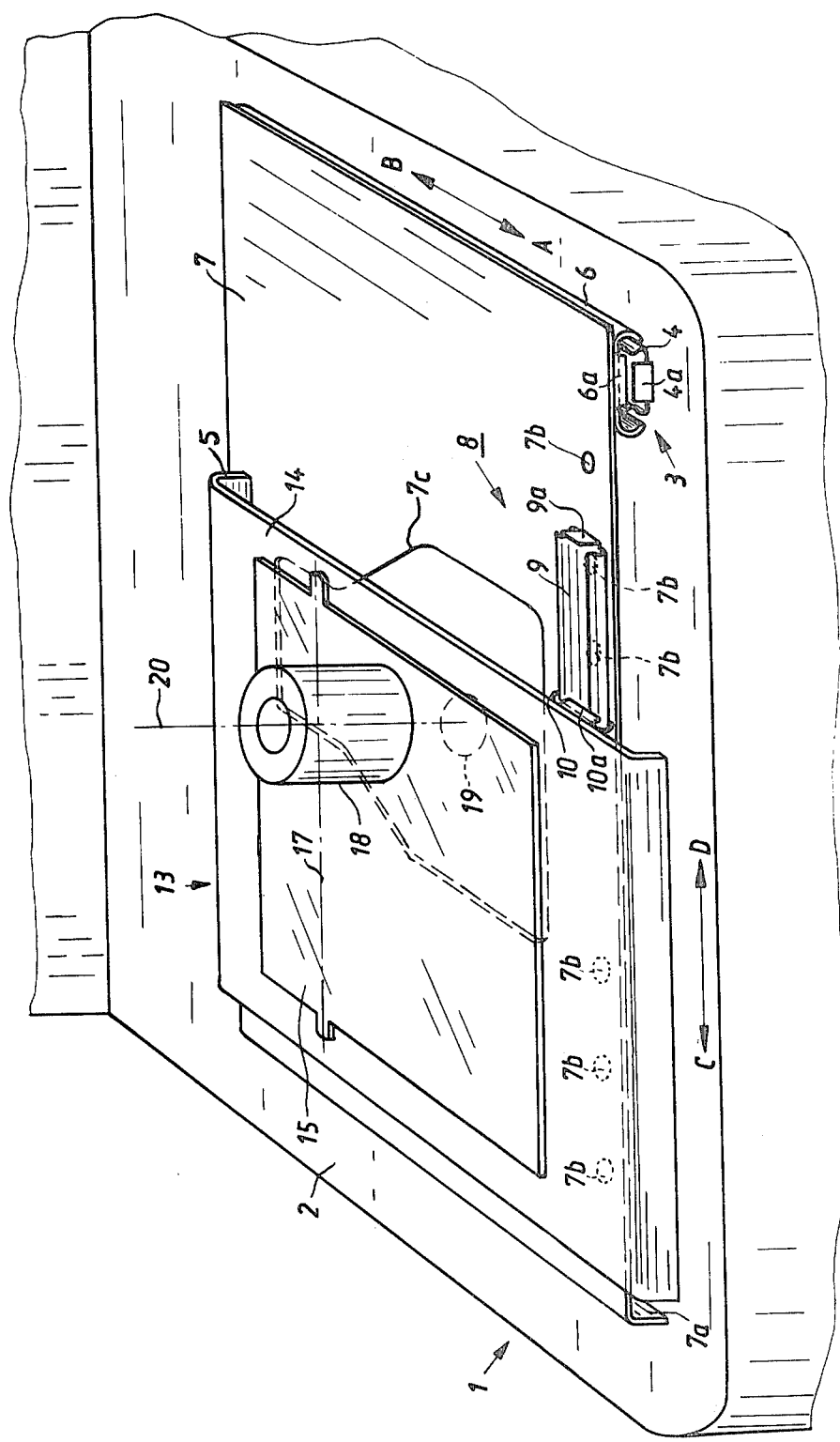
FIG. 1 illustrates in perspective the base portion of a microfiche reader with a film screen mounted thereon, in accordance with the invention.

FIG. 1 illustrates in perspective a base portion generally designated by the reference number 1 of the microfiche reader of the invention. The conventional image of the objective (projection lens) deflection mirror and screen which are mounted in the upper portion of the microfiche reader have not been illustrated for sake of clarity. A guide rail 3 is mounted on the upper surface 2 of the base portion 1 of the microfiche reader. This guide rail 3 encompasses a stationary supporting rail 4 on which is mounted by means of balls a movable rail portion 6. A carrier plate 7 is secured on the movable rail portion 6. As can be noted from FIG. 1 the left edge of the carrier plate 7, as viewed in FIG. 1, extends parallelly to the guide rail 3 and has a downwardly curved flange 7a that abuts against the upper surface 2 of the base 1. The flange 7a can be optionally provided with rollers or landing skids to minimize the frictional forces between the upper surface 2 and the flange 7a.

A guide rail 8 extends parallel to the front edge of the support plate 7, as viewed in FIG. 1, and this guide rail 8 extends also perpendicularly with respect to the guide rail 3. The overall construction of the guide rail 8 is identical to that of the guide rail 3. Thus the guide rail 8 also is composed of a fixed support rail 9, a running rail 10 as well as a ball cage 12 having balls 11 (see FIG. 2). A film screen 13 is mounted on the running rail 10 of the guide rail 8. This film screen is composed of a frame 14 in which there are mounted transparent plates 15, 16, between which the to be read microfiche is placed. The rear edge of the frame 14 has a downwardly extending edge flange 5 by means of which this film screen 13 is supported on the plate 7. The flange 5 can be optionally provided with rollers or landing skids. The upper transparent plate 15 is pivotally mounted about an axis 17 in a conventional known manner on the frame 14. The lower transparent plate 16 is secured to the underside of the frame 14 (see FIGS. 2-4). In order for a microfiche to be read by the microfiche reader of this invention the upper plate 15 is pivoted upwardly and the microfiche is placed between the upper plate 15 and the lower plate 16 and thereafter the upper plate 15 is again pivoted into a position wherein it is parallel to the lower plate 16. An image objective 18 is resiliently supported on top of the upper transparent plate 15. This objective lens 18 is a so-called "floating objective lens", which is resiliently biased against the upper transparent plate 15 so that, independent from minor irregularities in the path of movement of the film screen, there is maintained a constant distance between the projective lens 18 and the microfiche. A suitable support for such a floating objective lens is, for example, disclosed in copending and co-assigned application Ser. No. 817,730, filed July 21, 1977.

The illumination means for the microfiche reader are schematically illustrated in the drawing and are designated with the reference number 19. The reference number 7c refers to a cut-out in the plate 7 through which the microfiche is illuminated by means of the illuminating means 19.

The afore-described support arrangement makes it possible to move the plate 7 in the direction of the arrows A-B, respectively the film screen relative to the support plate 7 in the direction of the arrows C-D. Thus, the film screen can be moved at will in two coordinate directions, so that each desired picture of the microfiche mounted between the transparent plates 15, 16 can be correctly positioned in the light path 20 of the illuminating means 19.

In order to avoid that, during lateral slidable displacement of the film screen 13 in the direction C-D, the film screen 13 is moved to an extent whereby the objective lens 18 can fall downwardly through the opening 7c, the guide rail 8 has stops which limit the path of movement of the film screen 13 to an extent that avoids this possibility. For this purpose there are provided on the fixed rail 9 as well as on the running rail 10 at both ends stop surfaces 9a, respectively 10a, by means of which the ball cage 12 contacts with the parts 12a, 12b the respective stops 9a, 10a. Corresponding stops 4a, 6a are provided in the guide rail 3 to accomplish an equivalent limitation of movement of the guide rail.

The film screen 13 can be exchanged for another film screen of larger or smaller size. This is accomplished by mounting the support plate 7 in a detachable manner with respect to the guide rail 8. For this purpose the support plate 7 is provided with a plurality of bores 7b which coact with pins 21 extending downwardly from the underside of the fixed rail 9. In this manner the film screen 13 can be mounted in a simple manner in its predetermined position. In order to exchange the film screen it is simply lifted off the support plate 7 so that the pins 21 disengage from the corresponding mating bores 7b. Thereafter the larger or smaller film screen may be mounted on the support plate 7, whereby the length of the guide rail is always adapted to the width of the film screen. Thus, the arrangement of the invention provides that for each size of selected film screen there is already provided a suitably sized support having the necessary stops for limiting the movement of the selected film screen 13.

Figure 2:
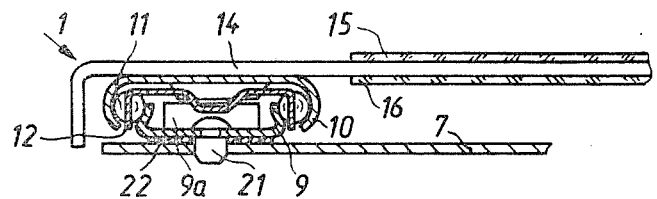
FIG. 2 illustrates a magnetic coupling between the guide rail confronting the film screen and the carrier plate on which the guide rail is mounted.
Figure 3:
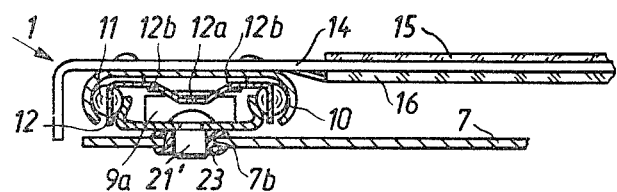
FIG. 3 illustrates a pin connection between the guide rail confronting the film screen and the carrier plate on which the guide rail is mounted.
Figure 4:
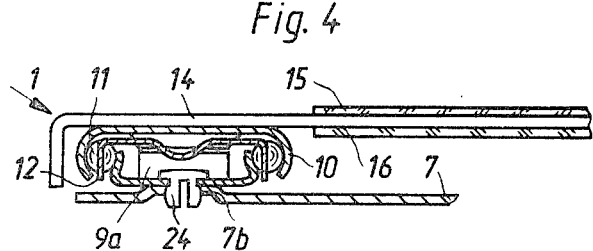
FIG. 4 is a button-pressure-fit-coupling between the guide rail confronting the film screen and the carrier plate on which the guide rail is mounted.

There is illustrated in FIGS. 2-4 various embodiments for mounting the guide rail 8 on the support plate 7.

There are illustrated in FIGS. 2-4 three embodiments for detachably mounting the guide rail 8 on the support plate 7. In the first embodiment, illustrated in FIG. 2, there is secured to the underside of the stationary rail 9 a magnetic strip 22 which is glued onto the underside of the rail 9 and which self-adheres to the support plate 7, which can, for example, be made out of sheet metal. The pins 21 serve in this embodiment merely to fix into position the film screen. The frustoconical shape of the pins 21 facilitates the mounting of the film screen on the support plate 7.

In FIG. 3 there is closed a second embodiment wherein the bores 7b are provided with a rubber lining 23 which facilitates a tolerance compensation and provides a firm seat for the pins 21' on the support plate 7. The support plate 7, in this case, can be made out of synthetic material.

Lastly, in FIG. 4, there is illustrated a third embodiment wherein, in lieu of pins 21, there are used pins 24 having a detent feature for mounting the guide rail 8 on the support plate 7, whereby two resilient legs of the pins 24 elastically snap into the bore 7b in the form of an elastic pressure knob thereby firmly holding the guide rail 8 in position on plate 7.

Although the invention is illustrated and described with reference to a plurality of preferred embodiments thereof, it is to be expressly understood that it is in no way limited to the disclosure of such a plurality of preferred embodiments, but is capable of numerous modifications within the scope of the appended claims.

What is claimed is:

1. In a microfiche reader with easily replaceable film screens, an improved coordinate film screen support arrangement for supporting the film screen for movement in two mutually perpendicular directions, comprising in combination, a base;

a support plate;

first and second mutually perpendicular guide rails adapted to move in two mutually perpendicular directions, said first guide rail supporting said film screen and said second guide rail supporting said support plate;

said second guide rail being operatively mounted on said base and said first guide rail being connected to said support plate, so that upon the application of a predetermined force said first guide rail can be manually separated from said support plate and replaced by a different guide rail and film screen supported thereby without the necessity of using any tools.

2. In a microfiche reader, the coordinate film screen support arrangement as set forth in claim 1, wherein said first and second guide rails each comprise a base rail section and a running rail section, and ballbearing means operatively mounted therebetween.

3. In a microfiche reader, the coordinate film screen support arrangement as set forth in claim 1, wherein said first guide rail and support plate having a pair of confronting surfaces, at least two bores in said confronting surfaces and at least two mating pins mounted opposite said bores for operative detachable engagement therein.

4. In a microfiche reader, the coordinate film screen support arrangement as set forth in claim 3, including magnetic means operatively connected to said pair of confronting surfaces, said detachable connection between said first guide rail and support plate being at least partially effected by magnetic forces from said magnetic means.

5. In a microfiche reader, the coordinate film screen support arrangement as set forth in claim 3, wherein said bores are provided with a rubber lining.

6. In a microfiche reader, the coordinate film screen support arrangement as set forth in claim 3, wherein said pins are made from elastic material and include detent means for resiliently engaging the surfaces of the mating bores.

7. In a microfiche reader, the coordinate film screen support arrangement as set forth in claim 1, including stop means mounted on each guide rail for limiting the movement thereof.

* * * * *